United States Patent [19]

Ogawa

[11] 4,347,533

[45] Aug. 31, 1982

[54] FACSIMILE READING AND RECORDING DEVICE

[75] Inventor: Mutsuo Ogawa, Yamato, Japan

[73] Assignee: Ricoh Company, Ltd., Tokyo, Japan

[21] Appl. No.: 183,279

[22] Filed: Sep. 2, 1980

[30] Foreign Application Priority Data

Sep. 6, 1979 [JP] Japan ............................ 54-113560

[51] Int. Cl.³ .................................... H04N 1/22
[52] U.S. Cl. ........................... 358/296; 346/139 C
[58] Field of Search ............ 358/296, 286, 285; 346/139 C, 154, 160, 164, 163, 160.1; 355/14 E

[56] References Cited

U.S. PATENT DOCUMENTS

| | | | |
|---|---|---|---|
| 3,470,563 | 9/1969 | Starr | 346/139 C |
| 3,946,403 | 3/1976 | Ikeuchi | 346/154 |
| 4,034,409 | 7/1977 | Levy | 358/301 |
| 4,107,742 | 8/1978 | Levy | 358/301 |
| 4,180,824 | 12/1979 | Yvard | 346/154 |
| 4,215,930 | 8/1980 | Miyakawa | 355/14 E |

FOREIGN PATENT DOCUMENTS 50-134435 10/1975 Japan ............................ 358/296

Primary Examiner—Bernard Konick
Assistant Examiner—Alan Faber
Attorney, Agent, or Firm—Oblon, Fisher, Spivak, McClelland & Maier

[57] ABSTRACT

In a reading and recording device comprising a read head consisting of a plurality of image information read elements and a record head consisting of a plurality of image information record elements, those read elements and record elements are connected to each other, forming a plurality of element pairs, and to a drive circuit which can be shared by the read head and the record head. Both at the reading and recording of image information, the same drive circuit can be used. The read head and the record head are integrally formed in one wiring board, constituting a reading and recording device which can be employed in a facsimile apparatus or an I/O device for a computer.

10 Claims, 14 Drawing Figures

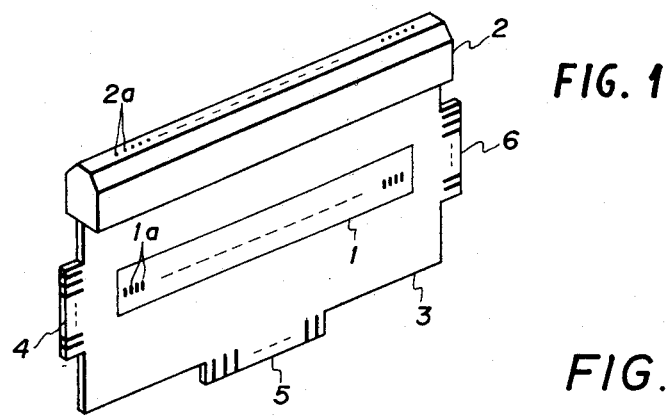
FIG. 1
FIG. 2
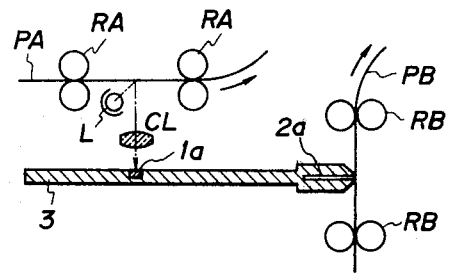
FIG. 3
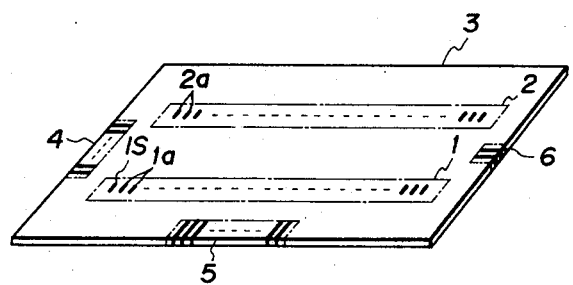
FIG. 4
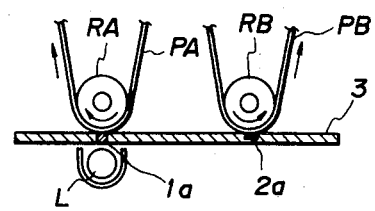
FIG. 5
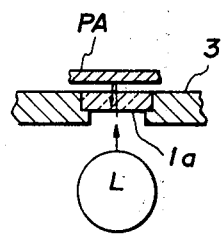

FACSIMILE READING AND RECORDING DEVICE

BACKGROUND OF THE INVENTION

The present invention relates to a reading and recording device comprising a read head for reading image information and a record head for recording the same for use in a facsimile apparatus, an I/O device for computers or the like.

Conventionally, for example, in a facsimile apparatus employing a reading and recording device, the drive circuits for activating a read head so as to produce image signals therefrom in accordance with the image information read by the head, and the drive circuits for activating a record head in accordance with image information input thereto, are separately disposed. Therefore, a large number of circuit elements are required. Furthermore, since each drive circuit is required to be connected to each head using a number of lead wires, it has been difficult to dispose the read head and the record head in close proximity to, or integrally with, each other in a single board member.

Therefore, the conventional reading and recording device is over-sized and accordingly expensive.

SUMMARY OF THE INVENTION

It is therefore an object of the present invention to provide an inexpensive and compact reading and recording device with the shortcomings of the conventional reading and recording device eliminated, by reducing the number of circuit elements.

In order to accomplish this object, a single drive circuit which can be shared by the read head and record head is employed, and the read head and the record head are disposed integrally with a single wiring board in a reading and recording device according to the present invention.

In the present invention, since the drive circuit can be shared by the read head and the record head at both the reading and recording of image information, the number of the circuit elements can be reduced significantly. Further, the current circulation-prevention diodes disposed in the circuits for the read elements and record elements can also be shared by the read head and the record head. This also makes a contribution to the reduction of the number of lead wires, making it possible to dispose the read head and the record head integrally in a single wiring board and making the reading and recording device compact in size and inexpensive.

BRIEF DESCRIPTION OF THE DRAWINGS

In the drawings,

FIG. 1 is a perspective view of an embodiment of a reading and recording device according to the present invention.

FIG. 2 is a schematic sectional view of the reading and recording device in FIG. 1, which is used in reading and recording operations.

FIG. 3 is a perspective view of another embodiment of a reading and recording device according to the present invention.

FIG. 4 is a schematic sectional view of the reading and recording device in FIG. 3, which is used in reading and recording operations.

FIG. 5 is a schematic partial sectional view of the read head portion of the reading and recording device in FIG. 4.

DETAILED DESCRIPTION OF THE PREFERRED EMBODIMENTS

Figure 6:
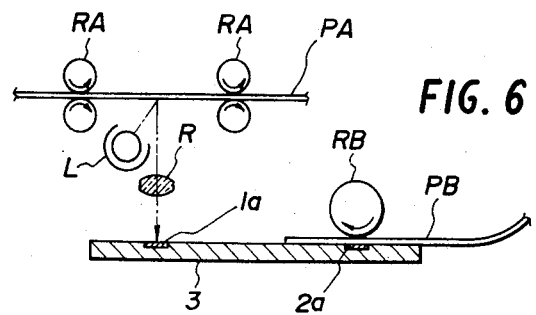
FIG. 6 is a schematic sectional view of a further embodiment of a reading and recording device according to the present invention.

Referring to FIG. 1, there is perspectively shown an embodiment of a reading and recording device according to the present invention. In the figure, reference numeral 1 represents a read head portion in which read elements 1a for one line are aligned. Reference numeral 2 represents a record head portion in which record elements 2a for one line are aligned.

The read head portion 1 and the record head portion 2 are both fixed integrally to a wiring board 3.

In the wiring board 3, there are formed terminal portions 4 and 5 which are connected to a drive circuit which will be described in detail later, and to a terminal portion 6 which is connected to an amplifier circuit which will also be described in detail later.

In the wiring board 3, the wiring is such that each terminal of the terminal portions 4, 5 and 6 is connected to the elements 1a and 2a of the head portions 1 and 2, whereby at the reading of image information, in accordance with the image signal input to the terminal portions 4 and 5, the corresponding image signal is output from the terminal portion 6; while at the recording of image information, in accordance with the image signal input to the terminal portions 4 and 5, each record element 2a is activated.

The embodiment of the reading and recording device thus constructed is located with respect to an original document and a recording sheet, for example, as shown in FIG. 2, in order to perform the reading of image information.

In FIG. 2, PA represents an original document; RA, original document transport rollers; RB, a recording sheet; and PB, recording sheet transport rollers.

The reading of image information is performed by projecting light from a light source L onto the original document PA and causing light reflected from the original document PA to enter the read elements 1a through a condenser lens CL. The recording of the image information is performed by actuating the record elements 2a in accordance with the output of a drive circuit which will be described later.

Referring to FIG. 3, there is shown perspectively another embodiment of a reading and recording device according to the present invention. In FIG. 3, the same reference numerals employed in FIG. 1 indicate the same or substantially the same elements or portions as those of the reading and recording device in FIG. 1. The only difference in construction between the reading and recording device in FIG. 3 and the reading and recording device in FIG. 1 is that, in the reading and recording device in FIG. 3, the read head 1 and the record head 2 are disposed in the same plane of the wiring board 3.

The reading of image information is performed by disposing the original document transport roller RA in the read head portion 1 and the light source L right under the read head 1a as shown in FIG. 4, and moving the original document PA by the original document transport rollers RA in the direction of the arrow.

As the read elements 1a, translucent film elements made of, for example, CdS, are employed.

In this reading and recording device, as shown in FIG. 5, light emitted from the light source L passes through the translucent read elements 1a and is then reflected by the surface of the original document PA, and the reflected light reenters the read elements 1a. As a result, each read element 1a produces a signal in which a reference component thereof at a predetermined level corresponding to the quantity of light emitted directly from the light source L and an image component thereof corresponding to the quantity of light reflected by the surface of the original document PA, overlap. Therefore, by substracting the reference component from the signal produced from the read elements 1a, the image signal can be isolated.

The substraction of the reference component from the output of the read element 1a can be performed by disposing a reference element 1s for receiving only light from the light source L in the read head portion 1, and by subtracting the output of the reference element 1s from the output of the read elements 1a by use of a differential amplifier. If the output of the reference element 1s is adjusted appropriately, a binary output corresponding to the image information read can be obtained directly.

Figure 7:
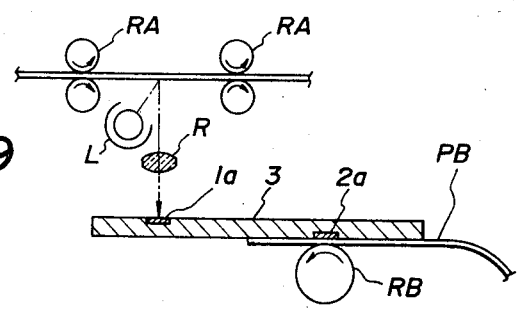
FIG. 7 is a schematic sectional view of a still further embodiment of a reading and recording device according to the present invention.

Alternatively, with the original document PA disposed relative to the read elements 1a on the wiring board 3 as shown in FIGS. 6 and 7, as in the case of the reading and recording device in FIG. 2, the images of the original document PA can be projected on the read elements 1a through a light-condensing phototransmitter R (refer to Japanese Patent Application Ser. No. 49-39864) comprising numbers of rod-shaped lenses which are closely arranged linearly and whose distribution of reflective index in the transverse cross section thereof changes continuously in a parabolic shape, if plotted, from its center to the outside. In such a construction, a differential amplifier is unnecessary.

The recording of image information can be performed by disposing the recording sheet transport rollers RB above the record head portion 2 as shown in FIG. 4, FIG. 6 and FIG. 7, and moving the recording sheet PB by the transport rollers RB, while activating the record elements 2a by the output of the drive circuit which will be described in detail later.

Figure 8:
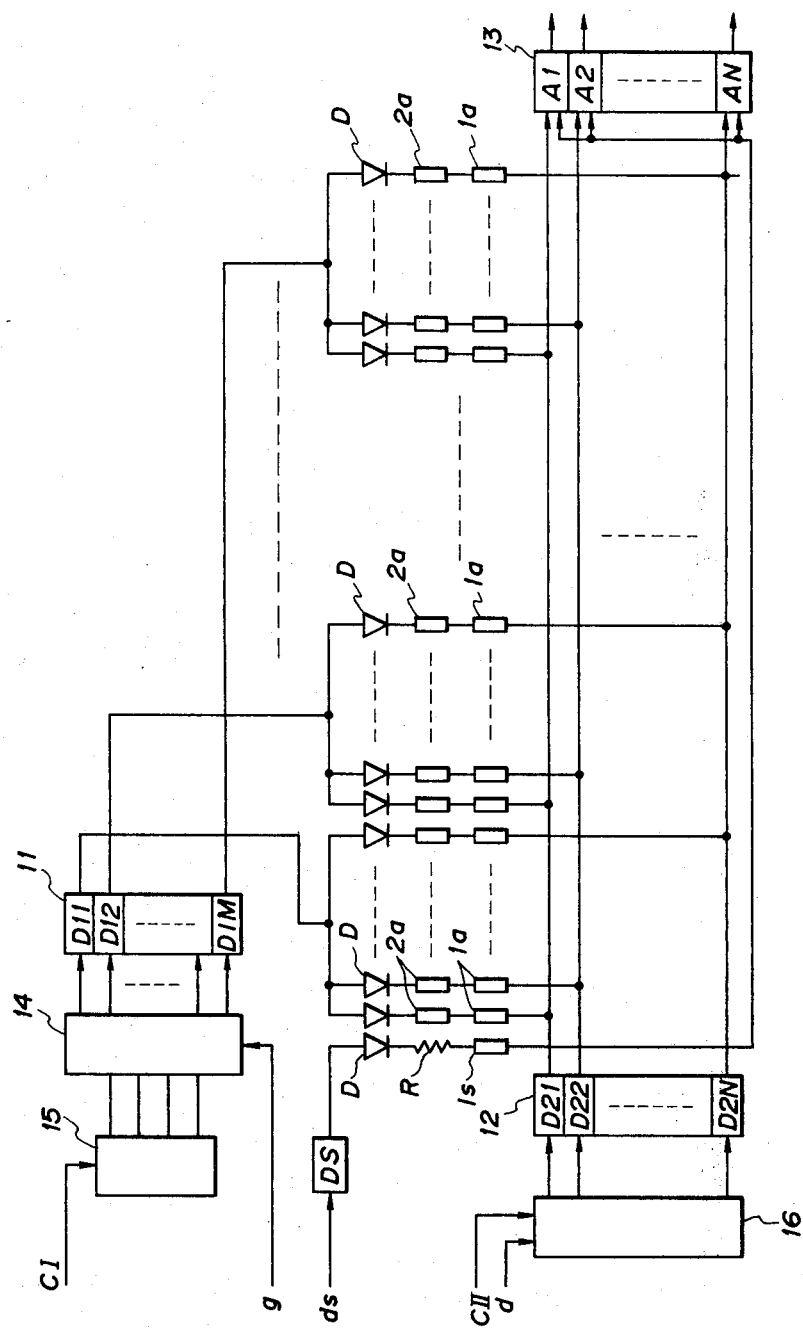
FIG. 8 is a circuit diagram of a reading and recording device drive circuit which is employed in one embodiment of a reading and recording device according to the present invention.

Referring to FIG. 8, there is shown a circuit diagram of a drive circuit for activating a reading and recording device constructed as mentioned above for performing the reading and recording of image information. In the figure, reference numerals 1a and 2a respectively represent the read elements and record elements. In this embodiment, as the read elements 1a, CdS elements are employed, while as the record elements 2a, heat emitting resistors are employed.

Further, in this embodiment, in order to simplify the construction of the drive circuit, the read elements 1a and the record elements 2a are respectively formed into M groups, each of which consists of N elements. More specifically, a read element 1a and a record element 2a constitute an element pair, and N element pairs constitute one element group and there are M element groups. As a matter of course, other groupings of the read elements 1a and record elements 2a could be possible.

Reference numeral 11 represents a group selection drive circuit for connecting each element pair group of read elements and record elements in each element sequentially to the drive power source. The group selection drive circuit 11 consists of M drive circuits D11–D1M of the same construction. Reference numeral 12 represents an element selection drive circuit for selectively activaing each element pair in each element group, which consists of N drive circuits D21–D2N. Reference numeral 13 represents an amplifier circuit for taking out image information from each element pair in each element group in a parallel way at the reading of image information. The amplifier circuit 13 consists of N differential amplifiers A1–AN of the same construction.

As mentioned previously, a read element 1a made of a CdS element and a record element 2a made of a heat emitting resistor are connected in series to each other, constituting an element pair. One end of each element pair in each element group is connected to one of the drive circuits D11–D1M via a current-circulation-prevention diode D, while the other end of each element pair in each element group is connected to one of the drive circuits D21–D2N of the element selection drive circuit 12 and to one of the differential amplifiers A1–AN of the amplifier circuit 13, in accordance with the arrangement order of the element pairs in each element group.

The differential amplifiers A1–AN each are constructed so as to produce an image signal corresponding to the image information by subtracting the output signal of the reference element 1s from the output signal of the CdS 1a at the reading of image information.

Figure 9:
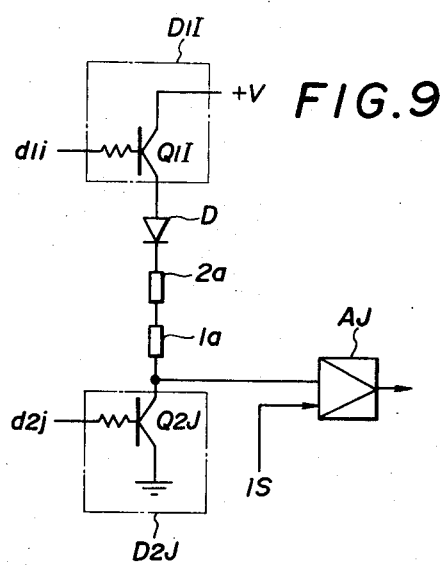
FIG. 9 is a circuit diagram of a specific drive circuit for use in the reading and recording device drive circuit in FIG. 8.

The drive circuits D11–D1M and D21–D2N, which are respectively represented by D1I and D2J in FIG. 9, comprise a PNP transistor Q1I and a NPN transistor Q2J, respectively, so that at the transmission of image information, only the transistor Q1I is actuated in accordance with signals d1i and d2j input thereto, and an electric current corresponding to the quantity of light received by the CdS 1a is input to a differential amplifier AJ. At the recording of image information, when the transistors Q1I and Q2J are activated, an electric current flows into the heat emitting resistor 2a, so that the recording of image information is done.

In FIG. 8, DS represents a drive circuit for activating the reference CdS 1s; reference numeral 14, a decoder; reference numeral 15, a counter; and reference numeral 16, a shift register.

In the embodiment of the thus constructed reading and recording device according to the present invention, at the reading of image information, a clock CI is input to the counter 14 from a reading and recording controller (not shown) at a predetermined timing. At the same time, a signal ds is input to the drive circuit DS, so that a drive voltage is applied to the CdS 1s via a resistor R. The counter 15 counts the clock CI and outputs the counted value of the clock Ci to the decoder 14.

In accordance with the counted value, the decoder 14 outputs a group selection signal d1i to a predetermined drive circuit D1I in accordance with a gate signal g which is input to the decoder 14 at a predetermined timing.

On the other hand, at the reading of image information, no signal is input to the shift register 16, and the shift register 16 remains reset. Therefore, the drive circuits D21-D2N are in the state of "OFF."

As a result, selected element pairs are independently connected to their respective drive power sources and to the differential amplifiers A1-AN.

Figure 10:
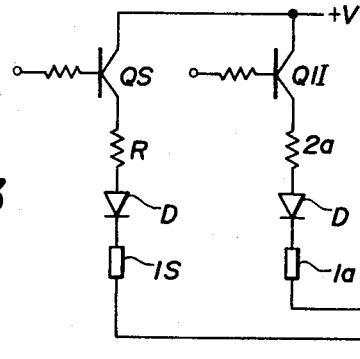
FIG. 10 is a circuit diagram of an equivalent circuit to the reading and recording device drive circuit in FIG. 8, at the reading of image information.

FIG. 10 shows an equivalent circuit in the above-mentioned case. In this equivalent circuit, the heat emitting resistor 2a works as an ordinary resistor.

Therefore, referring back to FIG. 8, the electric current corresponding to the quantity of light received by the CdS 1a and a constant electric current output from the reference CdS 1s are input to the differential amplifier AJ, so that an image signal corresponding to the image of the original document is output.

Thus, in accordance with the clock CI input to the counter 14 at a predetermined timing, the element pairs are sequentially selected and N image signals are sequentially output from the amplifier circuit 13 in a parallel way, so that the reading of image information for one line is performed.

At the recording of image information, a decoded image signal d is input to the shift register 16 from an image information processing circuit (not shown) in accordance with a shift clock CII. When N image signals d have been input to the shift register 16, the circuits D21-D2N of the drive circuit 12 are set in an ON-OFF state in accordance with the image signals d input thereto.

On the other hand, when N image signals are input to the shift register 16, the clock CI is input to the counter 15, so that selected element pairs are connected to the drive power source in the same manner as mentioned above.

Figure 11:
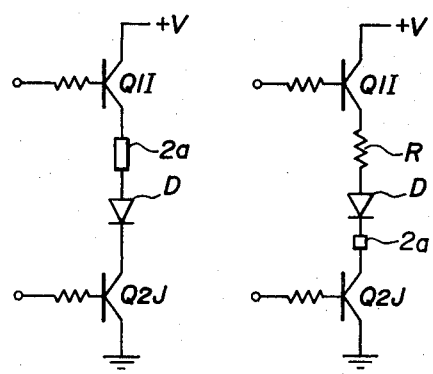
FIG. 11 is a circuit diagram of an equivalent circuit to the reading and recording device drive circuit in FIG. 8, at the recording of image information.

At that time, by illuminating the CdS 1a continuously, its resistance component can be almost nullified. FIG. 11 shows an equivalent circuit in that case.

The electric current which flows across each heat emitting resistor 2a in the selected element pairs is set in the state of ON or OFF, in accordance with image signals input thereto. As a result, accurate image information is recorded on the recording sheet.

After each recording operation by one group is completed, image signals for the next group are input to the shift register 16 and, at the same time, clock CI is input to the counter 15 for sequential selection of the element group, so that the recording of image information for one line is performed.

Figure 12:
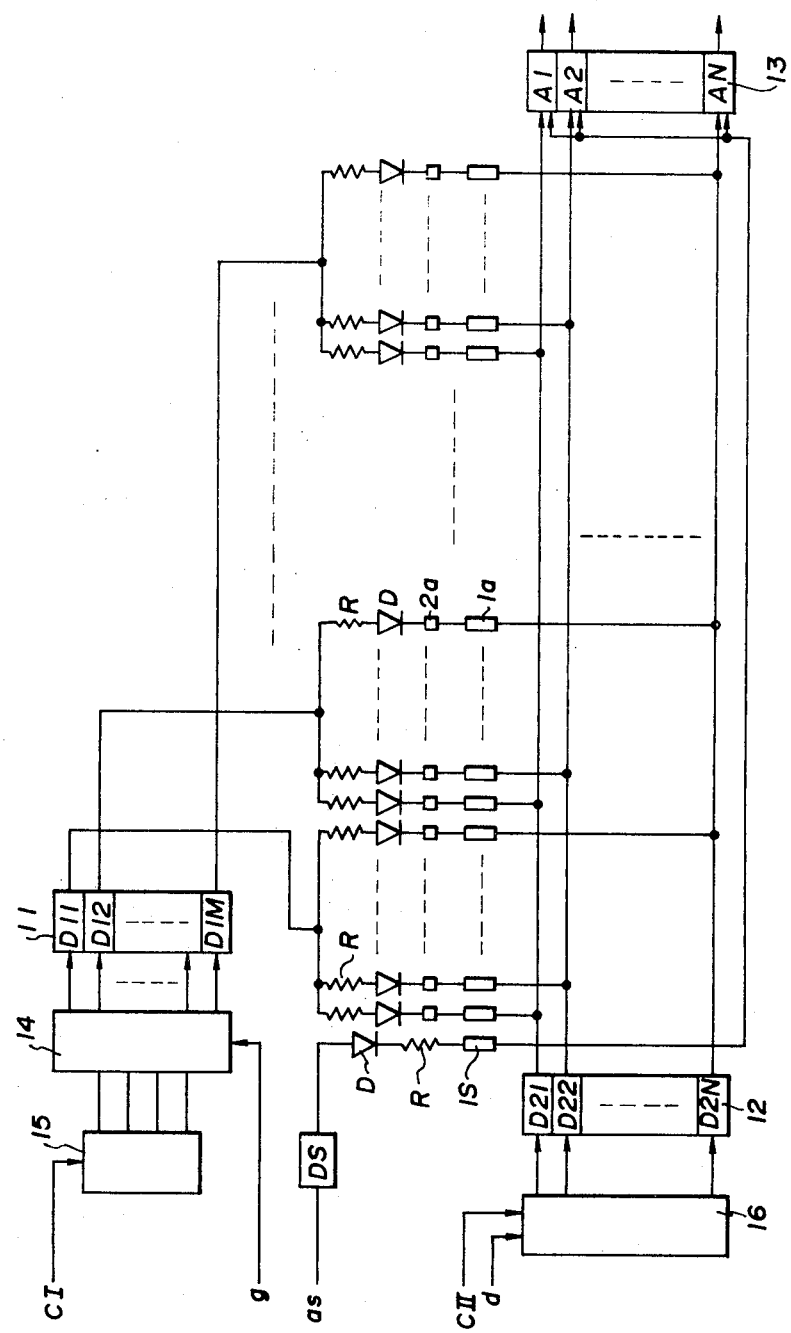
FIG. 12 is a circuit diagram of a reading and recording device drive circuit which is employed in another embodiment of a reading and recording device according to the present invention.

Referring to FIG. 12, there is shown a circuit diagram in which styli are used as the record elements 2a for recording image information on electrocatalytic paper.

Figure 13:
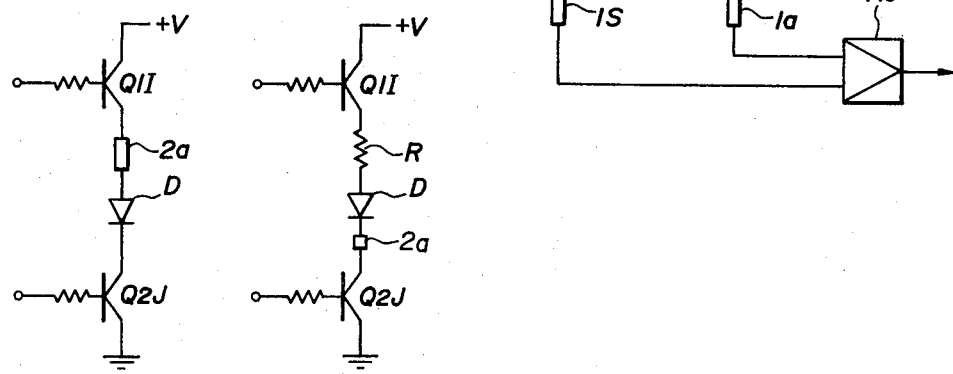
FIG. 13 is a circuit diagram of an equivalent circuit to the reading and recording device drive circuit in FIG. 12, at the recording of image information.

In this case, it may take place that the output of the drive circuits is directly grounded. Therefore in order to prevent such inconvenience, protective resistors R are inserted. This is the only difference in construction between the facsimile head in FIG. 12 and that in FIG. 8. The reading of image information is performed by the equivalent circuit shown in FIG. 10, and the recording of image information is performed by the equivalent circuit shown in FIG. 13.

In the above-mentioned two embodiments, when the reading of image information is performed, the image signals are taken out in a parallel way from each element group, by use of the N differential amplifiers. The image signals can also be taken out serially by use of one differential amplifier.

Figure 14:
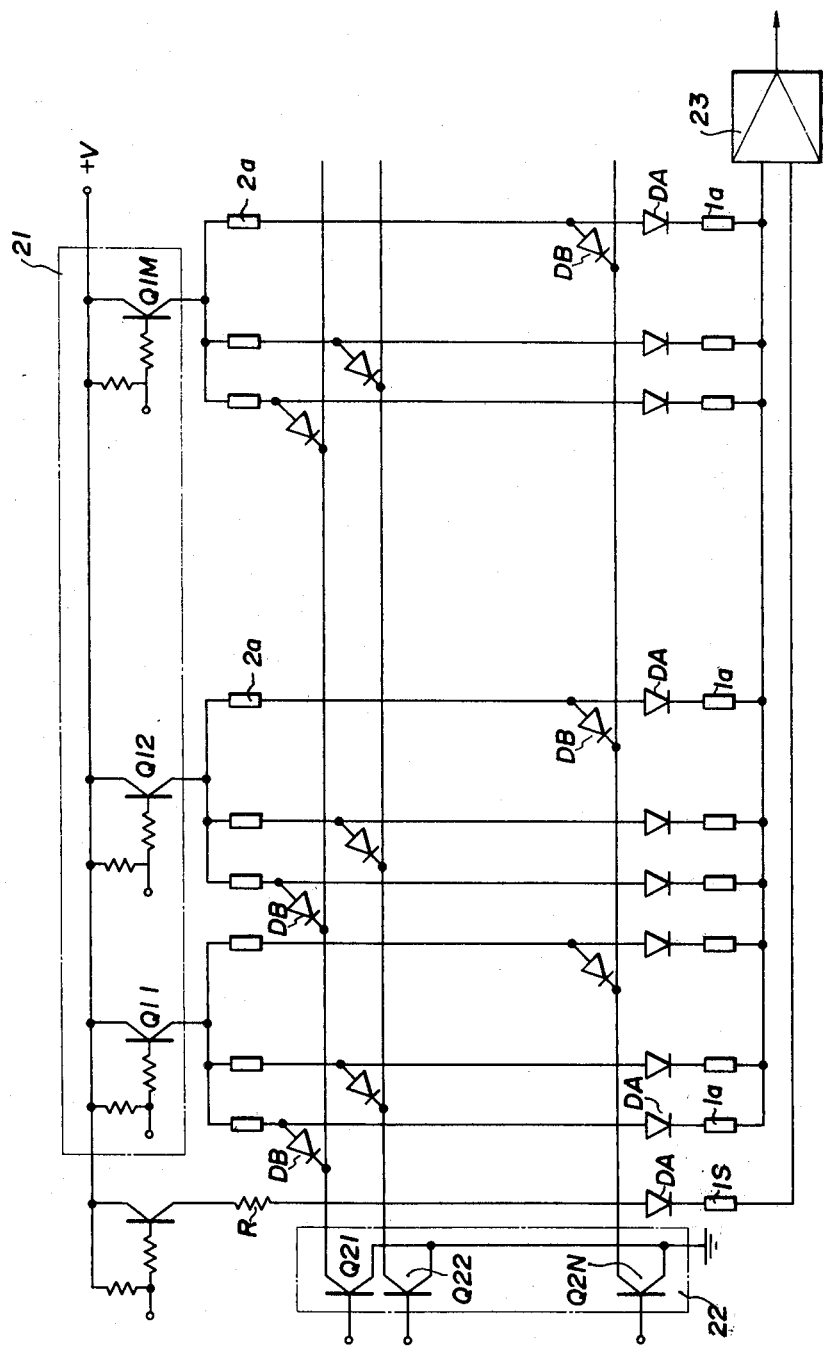
FIG. 14 is a circuit diagram of a reading and recording device drive portion in a further embodiment of a reading and recording device according to the present invention.

Referring to FIG. 14, there is shown a circuit diagram of a reading and recording device according to the present invention, in which such single differential amplifier is employed as mentioned. In the figure, reference numeral 21 represents a group selection drive circuit for selectively applying a drive voltage to each element pair in each element group. Reference numeral 22 represents an element selection and drive circuit for activating each read element 1a sequentially at the reading of image information and causing the same to produce an image signal, and for activating each record element 2a sequentially in accordance with the image signal input thereto at the recording of image information, to perform the recording of image information. Reference numeral 23 represents a differential amplifier.

As mentioned previously, a read element 1a and a record element 2a constitute an element pair. In each element pair, the read element 1a and the record element 2a are connected to each other via a current-circulation-prevention diode DA. Further, N element pairs constitute one element group. In this embodiment, there are M element groups, each of which is connected to one of M transistors Q1I-Q1M in such a manner that each element pair in each element group is connected to one of the transistors Q1I-Q1M. Further, between the read element 1a and the record element 2a of each element pair in each element group is connected one of N transistors Q21-Q2N of the element selection and drive circuit 22 via an element selection diode DB, in accordance with the arrangement order of the element pairs in each element group.

Thus, at the reading of image information, each of the transistors Q11-Q1M of the group selection drive circuit 21 is sequentially activated by a group selection signal. On the other hand, each of the transistors Q21-Q2N of the element selection and drive circuit 22 is initially in the state of "ON." Each time one transistor of the group selection drive circuit 21 is activated, each transistor of the element selection and drive circuit is sequentially deactivated. As a result, each read element 1a is sequentially connected to the drive power source, and the output of each read element 1a is sequentially input to a differential amplifier 23. Since a reference signal at a predetermined level which is output from a reference element 1s is also input to the differential amplifier 23 in the same manner as mentioned previously, the image signal corresponding to the image information is taken out serially from the differential amplifier 23.

At the reading of image information, the transistors Q11–Q1M of the group selection drive circuit 21 are sequentially activated as mentioned previously by the group selection signal. As a result, since each of the transistors Q21–Q2N of the element selection and drive circuit 22 is activated or deactivated in accordance with the image signal input thereto each time one element pair in each element group is selected, an electric current flows through a record element 2a connected to an activated transistor via the diode DB, so that the recording of image information can be performed.

What is claimed is:

1. A reading and recording device comprising:
a read head comprising a plurality of semiconductive photoconductive elements for reading image information,
a record head comprising a plurality of exothermic resistor elements for recording image information, said read head and said record head being substantially the same in circuit arrangement, and
a set of drive circuits which is connected to said read head and said record head and which can be used commonly for reading and recording image information selectively.

2. A reading and recording device comprising;
a read head comprising a plurality of semiconductive photoconductive elements for reading image information;
a record head consisting of a plurality of image information record elements;
an element pair constructing means for connecting said image information read elements in said read head to said image information record elements in said record head in such a manner that each of said read elements corresponds to one of said record elements, forming a plurality of element pairs; and
a set of drive circuits, each of which is connected to one of said element pairs, said one set of drive circuits being used for reading and recording of image information comprising means for driving all of said element pairs at the time of reading information and for driving a number of said element pairs in correspondence to the contents of image information at the time of recording of image information.

3. A reading and recording device as claimed in claim 2, further comprising an illumination means for illuminating all of said image information read elements of said record head at the recording of image information.

4. A reading and recording device as claimed in claim 2, further comprising a reference element for producing a read reference signal, disposed in said read head, and a differential amplifier for producing an image signal by inputting thereto the output of said reference element and the output of said image information read elements.

5. A reading and recording device as claimed in claim 2, comprising:
said plurality of image information recording elements comprising exothermic resistors; and
said drive circuits comprising means for applying voltage to one terminal of said element pairs during information reading such that reading of image information is performed, and
means for applying voltage to both terminals of said element pairs during recording so that recording of image information is selectively performed.

6. A reading and recording apparatus as claimed in claim 5, wherein said plurality of element pairs define a matrix, and the element pairs are disposed at the cross points of said matrix.

7. A reading and recording device comprising:
a read head portion in which a plurality of image information read elements are substantially aligned linearly;
a record head portion in which a plurality of image information record elements are substantially aligned linearly;
drive circuits coupled to said read elements and said record elements; and
a wiring board for connecting, said image information read elements in said read head to said image information record elements in said record head in such a manner that each of said read elements correspond to one of said record elements, forming a plurality of element pairs and common terminals disposed on said wiring board for connecting said plurality of element pairs to said drive circuits.

8. A reading and recording device as claimed in claim 7, wherein said read head portion is disposed on one side of said wiring board, and said record head portion is disposed on one end surface of said wiring board.

9. A reading and recording device as claimed in claim 7, wherein said read head portion and said record head are disposed, apart from each other, on the same side of said wiring board.

10. A reading and recording device as claimed in claim 7, wherein said read head portion is disposed on one side of said wiring board, and said record head portion is disposed on the other side of said wiring board.

* * * * *